United States Patent [19]

Cerutti

[11] Patent Number: 5,526,513
[45] Date of Patent: Jun. 11, 1996

[54] MEMORY ADDRESSING DEVICE

[75] Inventor: Walter Cerutti, Ivrea, Italy

[73] Assignee: Ing. C. Olivetti & C., S.p.A., Turin, Italy

[21] Appl. No.: 344,634

[22] Filed: Nov. 17, 1994

Related U.S. Application Data

[63] Continuation of Ser. No. 793,536, Nov. 18, 1991, abandoned.

[30] Foreign Application Priority Data

Nov. 19, 1990  [IT]  Italy ...................... 67903/90

[51] Int. Cl.⁶ .................................................. G06F 12/08
[52] U.S. Cl. ............... 395/496; 395/421.01; 395/421.07; 364/DIG. 1
[58] Field of Search ...................... 395/400, 425, 395/496, 494, 481, 410, 421.01, 421.07

[56] References Cited

U.S. PATENT DOCUMENTS

| | | | |
|---|---|---|---|
| 5,131,083 | 7/1992 | Crawford et al. | 395/275 |
| 5,170,481 | 12/1992 | Begun et al. | 395/275 |
| 5,210,845 | 5/1993 | Crawford et al. | 395/425 |
| 5,291,580 | 3/1994 | Bowden, III et al. | 395/425 |
| 5,321,827 | 6/1994 | Lu et al. | 395/325 |

FOREIGN PATENT DOCUMENTS 0428149  5/1991  European Pat. Off. .

OTHER PUBLICATIONS

"The 80486: A Hardware Perspective" by Ron Sartore, Byte Magazine, Fall 1989 pp. 67–74.
Thorson, Mark, "Matra Introduces 486 Cache Controller", Microprocessor Report, Feb. 7, 1990 pp. 16–17.
Microsoft Press Computer Dictionary, 1994, pp. 138, 372, 373.
Thorson, Mark, "Matra introduces 486 cache controller; adapter chip handles burst cycles and snooping," Microprocessor Report, vol. 4, Issue 2, p. 16, Feb. 7, 1990.
i486 Microprocessor, Dec. 1989, Intel Order No. 240440-002, pp. 96–107.

*Primary Examiner*—Rebecca L. Rudolph
*Attorney, Agent, or Firm*—Banner & Allegretti, Ltd.

[57] ABSTRACT

A memory addressing device for data processing apparatus addresses in sequence and in a burst a series of memory locations in a single addressing period of a central processing unit. The device comprises enabling circuits to set a central processing unit (CPU) to a burst transfer cycle and to keep a memory control unit (MCU) in a waiting state during the burst transfer. An address generator circuit is capable of generating in sequence a series of memory address codes to address a series of locations in the memory (RAM) during the burst transfer cycle. A multiplexer circuit sends to the memory either the address code of the address generator or that of the memory control unit during the burst cycles and the normal cycles respectively. The device is particularly suitable for use in personal computers with high data transfer rates.

8 Claims, 4 Drawing Sheets

MEMORY ADDRESSING DEVICE

This application is a continuation of application Ser. No. 07/793,536, filed Nov. 18, 1991, now abandoned.

BACKGROUND OF THE INVENTION

The present invention relates to a memory addressing device for data processing apparatus comprising a memory (RAM), a central processing unit (CPU) capable of generating address signals for a first memory location, and a memory control unit (MCU) capable of converting the address signals into a memory address code to address the location, and in which the central processing unit may be activated for a burst transfer of data from a series of locations disposed in a predetermined order with respect to the first location.

In known machines of this type, a cycle of reading or writing an element of data from or to a memory location requires an addressing period (T1) in the memory control unit for the addressing of the location and a transfer period (T2) to load the data element to be written, or, as the case may be, to retrieve the stored data element.

The burst addressing of a series of memory locations requires that the read or write cycles comprise a single addressing period for the first location, followed immediately by a series of transfer periods solely for the transfer of data from the other locations. The memory control units available at low cost at the present time are not, however, capable of carrying out multiple addressing independently of the central processing unit or of enabling the CPU to transfer the data in burst mode.

SUMMARY OF THE INVENTION

An object of the present invention is that of developing data processing apparatus of relatively low cost which can address in sequence a series of memory addresses, with a single addressing period (T1) of the central processing unit and using a memory control unit inherently lacking the multiple addressing facility.

This problem is solved by the addressing device according to the invention, which includes control circuits capable of generating enabling and wait signals to set the central processing unit to a burst transfer cycle and to keep the memory control unit in a waiting state during the burst transfer, and an address generator circuit capable of generating in sequence a series of codes of other memory addresses to address the series of memory locations during the burst transfer cycle.

Thus a preferred memory addressing device for data processing apparatus, described in more detail below, addresses in sequence and in a burst a series of memory locations in a single addressing period of a central processing unit. The device comprises enabling circuits to set a central processing unit (CPU) to a burst transfer cycle and to keep a memory control unit (MCU) in a waiting state during the burst transfer. An address generator circuit is capable of generating in sequence a series of memory address codes to address a series of locations in the memory (RAM) during the burst transfer cycle. A multiplexer circuit sends to the memory either the address code of the address generator or that of the memory control unit during the burst cycles and the normal cycles respectively.

The invention is particularly suitable for the production of personal computers with high data transfer rates, especially personal computers using i486 CPUs made by Intel, and also chip sets for CPU 80386/DX, such as the 82C330, 82C331, and 82C332 units made by VLSI Technology Inc.

BRIEF DESCRIPTION OF THE DRAWINGS

The characteristics of the invention will be evident from the following description of a preferred embodiment, which is supplied by way of example and is not restrictive, with the aid of the attached drawings, in which:

FIG. 5 is a diagram of one of the blocks in FIG. 1.

DETAILED DESCRIPTION OF THE PREFERRED EMBODIMENT

Figure 1:
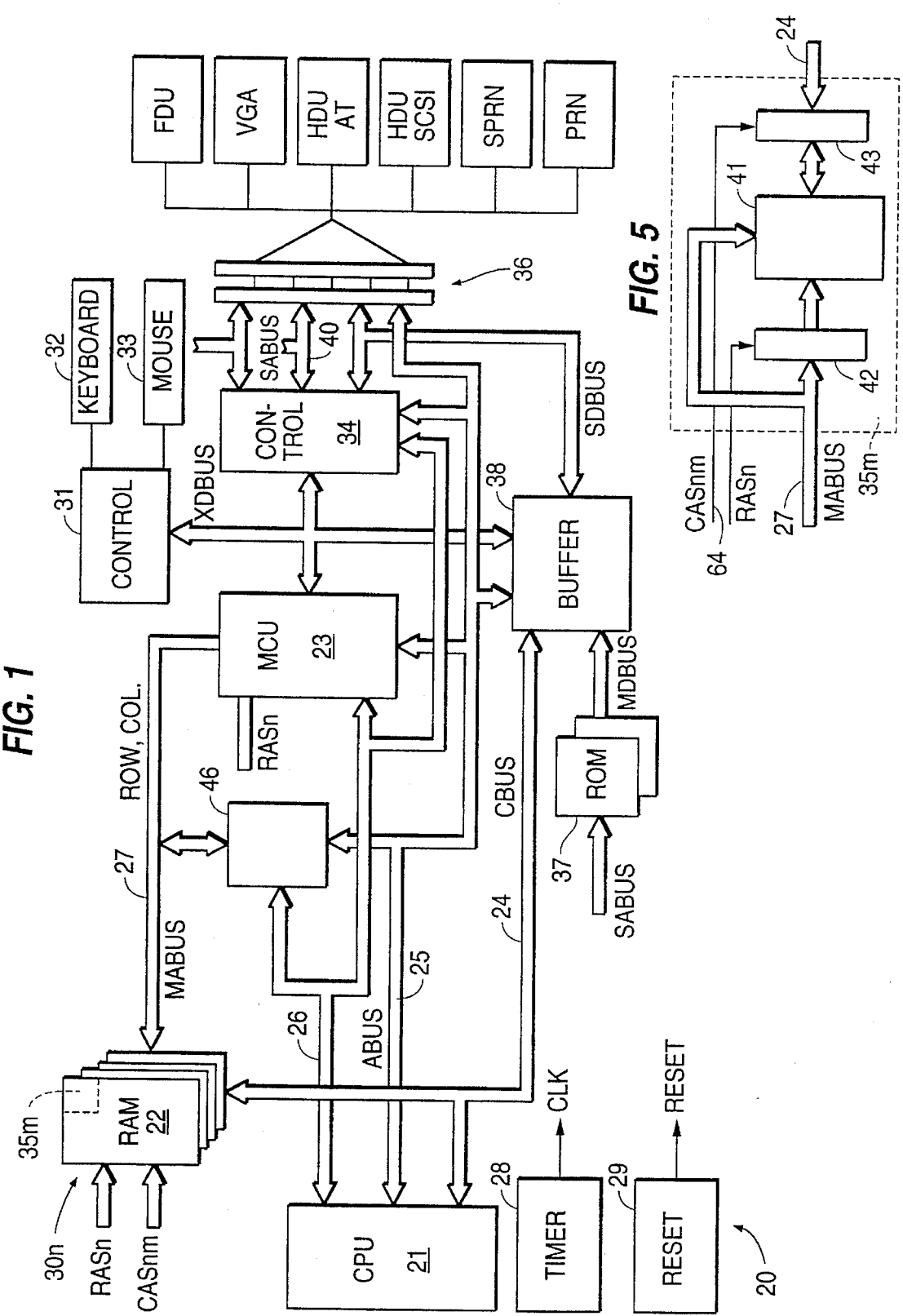
FIG. 1 is a block diagram of data processing apparatus with an addressing device embodiying the invention.

With reference to FIG. 1, the preferred data processing apparatus embodying the invention is indicated by 20 and comprises a central processing unit (CPU) 21, a memory set (RAM) 22 of the dynamic static column type, and a memory control unit (MCU) 23. The CPU 21 and the RAM 22 are connected by data lines DBUS 24 for the transfer of data between the units. The MCU 23 is interposed between the CPU 21 and the RAM set 22 and is also connected to the CPU through address lines ABUS 26 to receive address signals for the memory 22. The memory control unit 23, in response to the signals from ABUS, supplies to the RAM 22 a memory address code, through memory address lines MABUS 27, to address a corresponding location. The CPU 21 and the MCU 23 are also connected together by control lines CBUS 25. The data lines DBUS 24 and the address lines ABUS 26 each comprise 32 parallel lines (32-bit parallelism).

The RAM 22 has a matrix structure, comprising rows and columns, for the corresponding locations, and is organized in a number of banks 30n, for example from two to four (n being variable between 0 and 3) and in which each bank comprises four modules with 8-bit parallelism, indicated by 35m (m being variable between 0 and 3). The CPU 21, the RAM 22, and the MCU 23 respectively consist for example of an i486 microprocessor made by Intel Co., a memory of the HM 514258JP-6 type made by Hitachi Ltd., and an 82C330 control unit made by VLSI Technology.

A bank 30n and one or more modules 35m of the memory 22 may be selected by the CPU 21 by means of an enabling code on a terminal BE (FIG. 2) and an active signal on one of its terminals ADS connected to corresponding terminals of the MCU 23 through the CBUS 25 lines indicated by the same letters. The CPU 21 also enables the reading of the address signals from ABUS, sending an active signal on one of its terminals HOLDA which in turn is connected to the MCU 23 through a corresponding line of CBUS 25. The MCU 23 is designed to stabilise the enabling code and performs the selection of one or more modules 35m and of a bank 30n, sending an active signal on one or more lines, indicated by LBEm and CASBn (n and m being variable between 0 and 3), of CBUS 25.

The apparatus 20 (FIG. 1) also comprises a timer circuit 28 for the generation of clock signals CLK, a reset circuit 29 to generate a RESET signal on starting, local and external peripheral units and a peripheral control circuit (ISA) 34.

The local peripheral units comprise a ROM memory 37, containing the BIOS (Basic Input Output System) programs, and a keyboard control unit 31 which controls a keyboard 32 and a mouse 33. The external peripheral units may be connected to the apparatus 20 through connectors 36 and comprise a floppy disk drive FDU, a video unit VGA, hard disk drives HDU AT and HDU SCSI, a serial printer SPRN and a parallel printer PPRN.

The control circuit 34 may for example be of the 82C331 type and is capable of addressing the ROM and the external peripheral units through an address line SABUS and of receiving and transmitting data to the local and external peripheral units through the data lines XDBUS and SDBUS. The circuit 34 also has the function of requesting interrupts for the CPU and of controlling for direct accesses (DMA) to the memory 22, through lines 40. A buffer circuit 38, for example of the 82C332 type, is interposed between the data lines SDBUS and XDBUS, is controlled by lines of CBUS 25 and also receives the data from the ROM 37 through data lines MDBUS. The circuit 34 is capable of loading programming registers of the MCU 23 through the lines XDBUS on the basis of special programs of the ROM 37. The circuits 31, 34, 37 and 38 and their operation are not described since the particular form thereof is not material to the present invention.

The type i486 microprocessor made by Intel and used for the CPU 21 controls the data transfer on DBUS 24 with a maximum of 32 parallel bits. It also has the facility of 64-bit and 128-bit data processing for floating-point calculations by means of a mathematics co-processor, not shown in the drawings, and for loading an internal cache memory in high-speed mode. The loading of data having more than 32 bits is carried out by a multiple transfer process which requires up to four accesses to the memory 22. The CPU 21 provides two different transfer modes, one of the normal type and one of the burst type, in which the burst transfer with 32-bit parallelism is limited to the function of reading from the memory 22 only.

Figure 3:
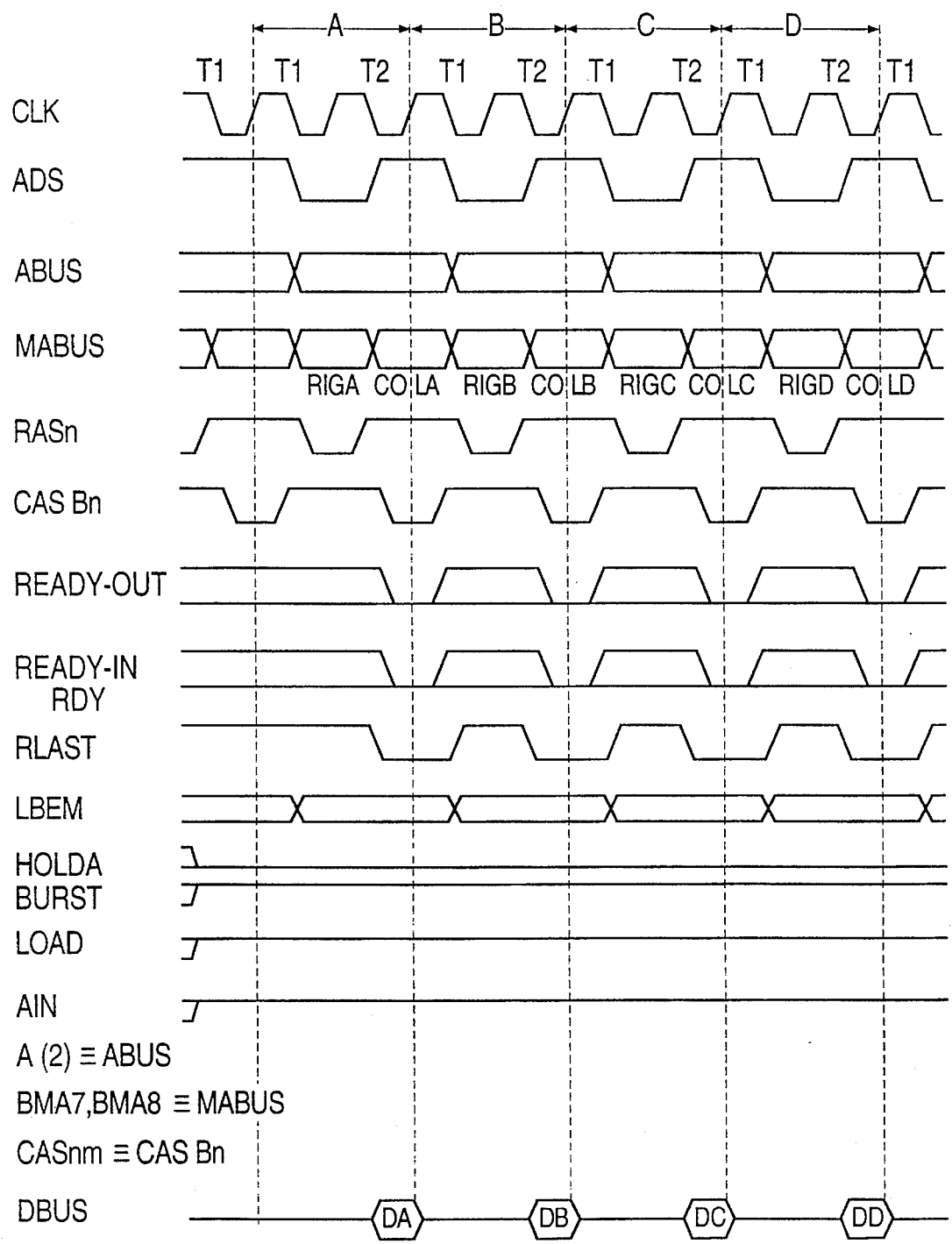
FIG. 3 is a timing diagram of some signals of the data processing apparatus of FIG. 1, in a first operating state.
Figure 4:
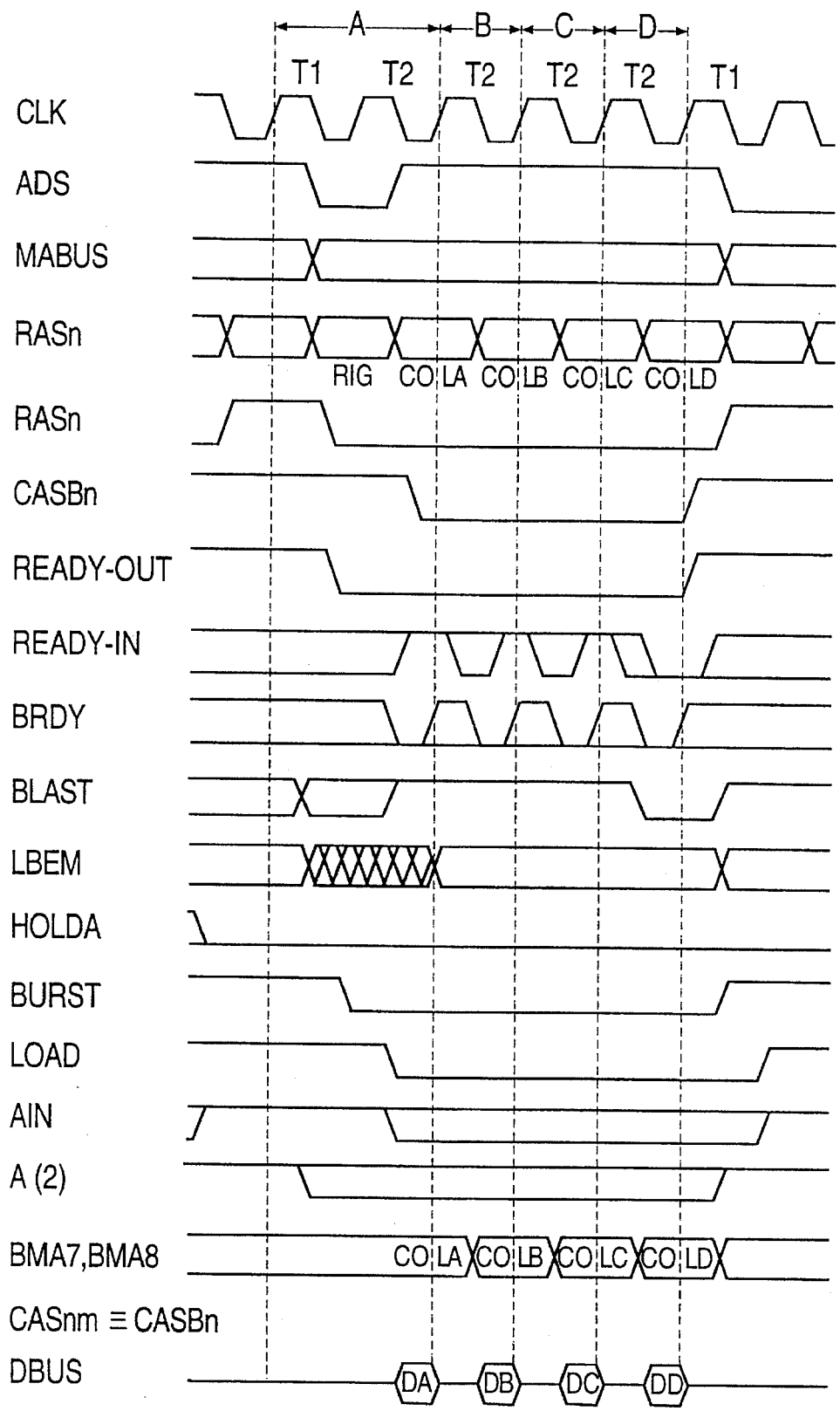
FIG. 4 is a timing diagram of some signals of the apparatus of FIG. 1, in a second operating state.

In a normal transfer, the CPU 21 transfers each data element in two CLK periods (FIG. 3), namely T1 and T2, of which the T1 period is used for the partial addressing of the location and the T2 period is used to complete the addressing and to make the data element available on the data line DBUS. In burst transfer, the CPU requires two CLK periods (FIG. 4) T1 and T2 to make only the first data element available, while it requires single periods T2 for the transfer of the other data in the series of data. Consequently, for example, the CPU 22 will require eight CLK periods (FIG. 3), consisting of (T1+T2)+(T1+T2)+(T1+T2)+(T1+T2), for the transfer of the data from four adjacent locations A, B, C and D in normal mode. The transfer of the four data elements in burst mode, on the other hand, will require only five CLK periods (FIG. 4), consisting of (T1+T2)+T2+T2+T2.

In the normal transfer mode, the CPU 21 (FIG. 2) supplies the 32-bit address signals on ABUS 26 for each of the locations A, B, C, D. The use of these signals by the MCU 23 is made possible by the active state of the enabling signal on ADS (FIG. 3) at the start of each period T1.

The CPU recognizes that the apparatus 20 has completed the transfer of the first data element and is ready to receive a new address when, at the end of the period T2, it receives an active signal on one of its terminals RDY. If, on the other hand, the signal on RDY is inactive at the end of T2, this indicates that the apparatus 20 requires a waiting state, ADS is disabled, and the cycle is repeated for another period T2 (not shown in the drawings) to complete the transfer of the data element.

The CPU 21 also signals that the transfer is normal by generating, during each period T2, an active signal on a terminal BLAST, connected to one of the CBUS lines represented by the same designation, which indicates that the transferred data element is the last of a series.

In the burst transfer mode, the CPU 21 (FIG. 2) supplies on ABUS 26 the 32-bit address signals of the first location A only, for the transfer of data in the period T1+T2. Consequently suitable external circuits must be provided to address in three successive periods T2 the three other locations B, C and D adjacent to location A. The signal on ADS (FIG. 4) is kept inactive from the end of the first period T2. However, the active signal on ADS, in accordance with the specific features of the i486 microprocessor, will not be valid for a correct stabilisation of the signals in the BE line and consequently for the definition of the signals on LBEm.

For the control of a burst transfer, the CPU 21 requires that the signal on the RDY terminal be inactive the end of the period T2, indicating that the system is not ready to receive another address, and that a confirmation signal on a terminal BRDY also be active, indicating that the system is capable of addressing a number of memory locations in sequence. The CPU 21, in turn, will be ready to transfer the data at the end of the second, third and fourth periods T2, in response to active system signals on the BRDY terminal and inactive signals on the RDY terminal. The signal on the BLAST terminal will be inactive at the end of the first cycle of the series to indicate that the data element to be transferred is not the last, while the transfer of the last data element of the series will be signalled by the CPU by the generation of an active signal on BLAST.

MCUs 23 of the 82C330 type and similar MCUs for chip set 386 comprise output terminals READY-OUT and input terminals READY-IN. The READY-OUT terminal is capable of supplying an active signal indicating that the MCU 23 is ready to generate the memory addresses and that, in known machines, it is designed to be connected to the RDY terminal of the CPU 21. The READY-IN terminal is capable of receiving another active signal to enable the generation of addresses, for example for a delayed transfer by means of a co-processor. In known machines without a co-processor, the READY-IN terminal is made inoperative by direct connect to READY-OUT. These types of MCU 23 are not, however, capable either of independently addressing memory locations or of generating the active signals on the BRDY terminal.

The memory address code is supplied by the MCU 23 (FIG. 1) on MABUS 27 as a conversion of the signals from ABUS and comprises, in sequence, two codes ROW and COL. The two codes ROW and COL may be used for access to the row and column of a location in the RAM 22, synchronised with two active enabling signals on the lines RASn and CASnm (n and m being variable between 0 and 3) of the memory 22 controlled by the MCU 23. Each of the lines RASn is connected to a bank 30n and the lines are common to all the modules 35m of the bank while the lines CASnm are connected individually to the modules 35n.

Each module 35m (FIG. 5) comprises a memory matrix 41 in which the locations are organised in rows and columns, a latch register 42 and a buffer circuit 43 connected to the line DBUS 24. The matrix 41 uses the signals on the lines of MABUS 27 connected to it both to define the row and to define the column of the desired location. The row address is common to all the modules of a bank and is stabilised by the latch register 42 of each module in response to a high/low switch of the signal on the corresponding line RASn, while the column address is supplied to the matrix by the state of the lines MABUS 27, without any stabilisation. The active signal on the lines of CASnm relative to one or more modules 35m of the bank 30n operates on the buffer circuit 43 and permits the connection of the addressed location of one or more modules 35m to the data line DBUS 24.

If a further switching of the active signal on the RASn lines is not caused, any variation in the MABUS lines 27 results in access to the location of a different column in each matrix 41. After a very short delay, the data element will be present on the DBUS 24 line for the reading transfer. This, as is known, makes it possible to save time if it is desired to address a location having the same row as a preceding location (fast page mode).

In response to the active signal on ADS, the MCU 23 is capable of generating, on terminals connected to the lines RASn, an active signal at the end of a first period T1, to address the row of the desired location. During the period T2, the active signals on one or more lines LBEm and CASBN will enable one or more modules 35m of the bank 30n. Finally, the MCU 23 is capable of generating an active signal on a terminal and a line RAMW to select the writing of data to the addressed memory location. The signal on RAMN will, on the other hand, be inactive in the case of reading the location.

In known machines, the signals on the LBEm and CASBn lines are used by a suitable interface circuit for the generation of the active signals on one or more CASnm lines for the reading of the data element in the column of the module or modules 35m defined by the temporary state of the MABUS lines. If its READY-IN terminal has been made operative and receives an active signal at the end of T2, the MCU 23 will inactivate the signals on the RASn and CASBn lines at the end of the first cycle T2.

Figure 2:
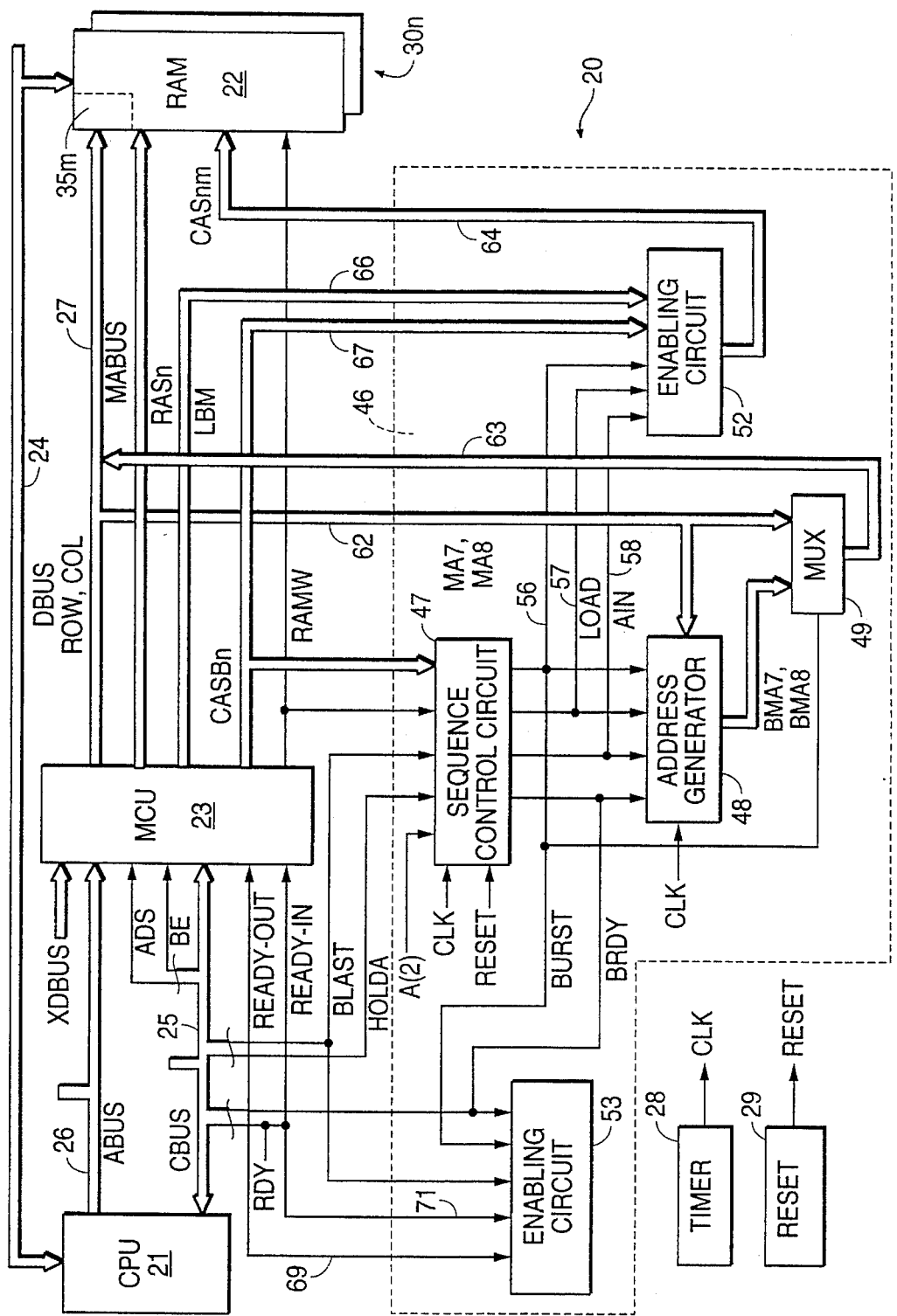
FIG. 2 is a detailed diagram of the addressing device.

The device embodying the invention is indicated by 46 in FIG. 2 and comprises a sequence control circuit 47 capable of generating an active signal on the BRDY terminal and a sequence of control signals, an address generator circuit 48 to generate additional address signals, and a multiplexer circuit 49 to transfer to MABUS 27 the additional address signals. The READY-IN terminal of the MCU 23 is disconnected from READY-OUT, the READY-OUT terminal is disconnected from RDY, and the device 46 comprises control circuits for the transfer of signals between the CPU 23, the MCU 23 and the RAM 22, consisting of a memory enabling circuit 52 to generate the signals on the CASnm lines for the RAM 22 and a transfer enabling circuit 53 to generate the active signals on the READY-IN line for the MCU 23 and on the RDY line for the CPU 21.

The sequence control circuit 47 receives the signals from the RAMW and CASBn lines from the MCU 23, the signals from the BLAST and HOLDA lines from the CPU 21, and an address signal with the least significant bit through a line A(2) of ABUS 26. The circuit 47 essentially has the function of interpreting the type of normal or burst transfer requested by the CPU 21 and is capable of generating an active signal on a line 55 connected to the BRDY terminal and designated with the same letters, and active control signals on the lines BURST 56, LOAD 57 and AIN 58. The BRDY line 55 is connected not only to the CPU 21 but also to the address generator 48 and to the enabling circuit 53; the BURST line 56 is connected to the four circuits 48, 49, 52 and 53, and the lines LOAD 57 and AIM 58 are connected to the address generator 48 and to the enabling circuit 52.

The address generator 48 also receives the least significant bits from MABUS 27 through the lines MA7 and MA8 from the MCU 23 and indicated by 62, and is connected to the multiplexer 49 through other address lines 61 to supply the additional address signals BMA7 and BMA8, relating to the columns of the memory locations, in the burst transfer mode, and for a maximum sequence of four locations.

The multiplexer 49 also receives the address codes with the least significant bits from the lines MA7 and MA8 and supplies the corresponding bits of the column address in the RAM 22 through two lines of MABUS 27, directed to the RAM 22 and indicated by 63. The source of the bits in line 63 may be lines 61 or lines 62, according to whether the state of the BURST line on the multiplexer 49 is active or inactive respectively. The address codes for the columns of the RAM 22 are therefore defined directly by the state of the outgoing MABUS 27 lines from the MCU 23 for the most significant bits and by the state of the lines 63 for the two least significant bits.

The memory enabling circuit 52 is capable of generating the signals for the CASnm lines, also indicated by 64, and is capable of receiving the signals from the lines LBEm and CASBn, also indicated by 66 and 67. In particular, the circuit 52 keeps four signals CASn1, CASn2, CASn3 and CASn4 active for the four modules 35-1, 35-2, 35-3 and 35-4 of the bank 30n originally addressed by the MCU 23 and up to the burst transfer of all the data, ensuring that their transfer takes place with a 32 bit parallelism in accordance with the following logic:

CASnm=!(!BURST&CASBn CASBn&LBEm) (n=0:3; m=0:3)

where the meaning of the symbols is !:=NOT; &:=AND :=OR.

The transfer enabling circuit 53 is connected to the CPU 21 and to the MCU 23 through lines 68 and 69 to receive the signals from the lines BLAST and READY-OUT respectively. The circuit 53 is also connected to the CPU 21 and to the MCU 23 through a line 71 to send an active signal on the READY-IN line and consequently to the RDY terminal. On encountering active signals on the BURST and BRDY lines and in response to an active signal on the READY-OUT line, the circuit 53 enables MCU 23 for the transfer, by transmitting an active signal on the READY-IN line. The circuit 53, on the other hand, disables the MCU 23 in response to the active signal on the BURST line, by not transmitting the active signal on the READY-IN line in response to the active signal on the READY-OUT line, according to the following logic:

READY-IN=!(!BLAST&!BRDY BURST&!READY-OUT)

In the case of reception of the active signal on the READY-IN line, the MCU 23 addresses a memory cycle in the modes provided for a normal transfer. The BURST signal is inactive and the multiplexer 49 proceeds to transfer the least significant bits originating from the MCU 23 to the lines 62.

The disabling of the MCU 23 ensures that the same column address codes for the first location addressed are maintained on the MABUS 27 line during the burst transfer. The sequence controller 47 consequently causes the initiation in the MCU 23 of a cycle of access to the RAM 22, inhibits the operation of the MCU 23 during the subsequent cycles and replaces it in the addressing of the locations associated with the transfer of the data between the RAM and the CPU. In this case, the multiplexer 49 will be enabled by the active BURST signal and will transfer to lines 62 the signals from the other address lines 61.

The sequence of generation of the column codes, the duration of these on the MABUS 27 lines and the synchronisation between the CPU and RAM for the data transfer are controlled by the sequence controller 47, through its output signals on the BURST, LOAD, AIN and BRDY lines, according to the following logic, in which the effect of the RESET signal, which is inactive during the standard operation, is omitted:

```
BURST=!(!LOAD&!Q3 AIN&LOAD&!Q1&Q3)
LOAD=!(AIN&LOAD&!Q1&Q3 !LOAD&!Q1&!Q3)
AIN=!(A2&AIN&LOAD&!Q1&Q3 !AIN&!LOAD&Q1&Q3)
BRDY=!(!LOAD&!Q3)
Q3=!(AIN&LOAD$!Q1&Q3 !LOAD&!Q1&!Q3)
Q1=!(AIN&LOAD&!Q1&!Q3 CLK&!LOAD&!Q1&!Q3
     BLAST&!LOAD&!Q1&!Q3
AIN&BLAST&!CASB0&!CASB1&!CASB2&CASB3&!HOLDA&
     LOAD&Q3&RAMW
AIN&BLAST&!CASB0&!CASB1&CASB2&!CASB3&!HOLDA&
     LOAD&Q3&RAMW
AIN&BLAST&!CASB0&CASB1&!CASB2&!CASB3&!HOLDA&
     LOAD&Q3&RAMW
AIN&BLAST&CASB0&!CASB1&!CASB2&CASB3&!HOLDA&
     LOAD&Q3&RAMW)
```

Finally, the address codes are generated by circuit 48 according to the following logic:

```
BMA7=!(BRDY&!LOAD&!BMA7 !BRDY&!LOAD&BMA7
       LOAD&!MA7)
BMA8=!(BRDY&!LOAD&!BMA8 !AIN&!BRDY&!LOAD&
       BMA7&!BMA8
!AIN&!LOAD&!BMA7&!BMA8 AIN&!LOAD&!BMA7&!BMA8
 AIN&!BRDY&!LOAD&BMA7&BMA8 LOAD&!MA8)
```

The circuits 47, 48, 49, 52 and 53 are constructed with special logic components of a known type, or preferably with programmable logic circuits (PAL) also of a known type and therefore not described.

It will be evident that the device described and illustrated comprises control circuits 52 and 53 capable of generating enabling signals (on BRDY) and wait signals (on READY-IN) to set the central processing unit 21 to a burst transfer and to keep the memory control unit 23 in a waiting state during a burst transfer cycle, and an address generator circuit 48 capable of generating in sequence a series of codes of other memory addresses BMA7 and BMA8, to address the series of memory locations during the burst transfer cycle.

What I claim is:

1. A memory addressing device for a data processing apparatus comprising a main memory of dynamic type organized in a plurality of banks each having a matrix structure of rows and columns (RAM), a central processing unit (CPU) for generating address signals on an address bus (ABUS) for a first memory location of said main memory of dynamic type (RAM), and a memory control unit (MCU) for converting said address signals into a multiplexed memory address code to address said first memory location, said central processing unit (CPU) being able to operate in a burst mode for the transfer of data from and to a series of memory locations of one of said banks disposed in a same row and different columns of said matrix structure with respect to said first memory location, wherein said memory control unit (MCU) is connected with said central processing unit (CPU) through said address bus (ABUS) and a control bus (CBUS) and is connected with said main memory of dynamic type (RAM) through a memory address bus (MABUS), and wherein said multiplexed memory address code comprises a row code and a column code, said memory addressing device comprising:

control circuits for generating, in response to said burst mode of said central processing unit (CPU) and to said multiplexed memory address code generated by said memory control unit (MCU), both a wait signal (READY-IN) to keep said memory control unit (MCU) in a waiting state during said burst mode of said central processing unit (CPU), and an enabling signal (BRDY); and an address generator circuit connected to said memory control unit (MCU) and to said main memory of dynamic type (RAM) for generating in sequence a series of signals (BMA7, BMA8) on said memory address bus to address the different columns of said series of memory locations during said burst mode;

said control circuits generating said enabling signal (BRDY) at each transfer of data from said main memory of dynamic type (RAM) to said central processing unit (CPU) and a final signal (READY-OUT) to said memory control unit (MCU) at the end of the sequence of said data transfer, whereby said memory control unit (MCU) generates a signal for said central processing unit (CPU) indicative that the required data transfer is finished.

2. The invention of claim 1, in which said central processing unit comprises an output terminal (BLAST) which may be activated by a signal indicating the last data element of a sequence, a first input terminal (RDY) for receiving a signal enabling the generation of other address signals, and a second input terminal (BRDY) for receiving an enabling signal for a burst transfer, and in which said control circuits comprise:

a transfer enabling circuit which responds to a signal from said output terminal (BLAST) indicating that the last location is not the last of a sequence, to generate a signal (inactive) which disables the generation of the address signals on said first input terminal (RDY) and a signal (active) which enables the burst transfer on said second input terminal (BRDY).

3. The invention of claim 2, in which said control circuits further comprise a sequence control circuit for supplying a sequence of control signals to said address generator circuit to activate the generation of said series of codes of other addresses.

4. The invention of claim 3, in which said sequence control circuit is connected at its input to said output terminal (BLAST) and supplies said burst transfer enabling signal to said second input terminal (BRDY) of said central processing unit.

5. The invention of claim 4, in which said transfer enabling circuit receives said burst transfer enabling signal from said sequence control circuit and supplies said enabling signal on said first input terminal (RDY).

6. The invention of claim 1, in which said control circuits further comprise a sequence control circuit for supplying a sequence of control signals to said address generator circuit to activate the generation of said series of codes of other addresses.

7. The invention of claim 1, in which said control circuits further comprise a multiplexer circuit for supplying to said memory the codes of other addresses generated by said address generator circuit in substitution for said memory address code of said memory control unit.

8. A memory addressing device according to claim 1, for use with an apparatus in which said memory is distributed over a plurality (n) of banks and a plurality (m) of modules and in which said memory control unit (MCU) is connected to another portion of said control bus and responds to first and second signals (BE, ADS) from the central processing unit to generate control signals on bank control lines (CASBn) and module control lines (LBEm) for accessing a bank and one or more modules, and in which said control circuits comprise:

a memory addressing enabling circuit responsive to signals in said bank and module control lines (LBEm, CASBn) to generate module control signals (CASnm) in parallel for all the modules of a bank enabled in a burst transfer cycle; and wherein a buffer circuit is connected between each of said modules and a data bus and responds to said module control signals (CASnm) for causing the burst transfer of all the content of said series of memory locations.

* * * * *